Oct. 13, 1953   J. MARTIN   2,655,329
PARACHUTE AND SEAT HARNESS
Filed Aug. 28, 1950   4 Sheets-Sheet 1
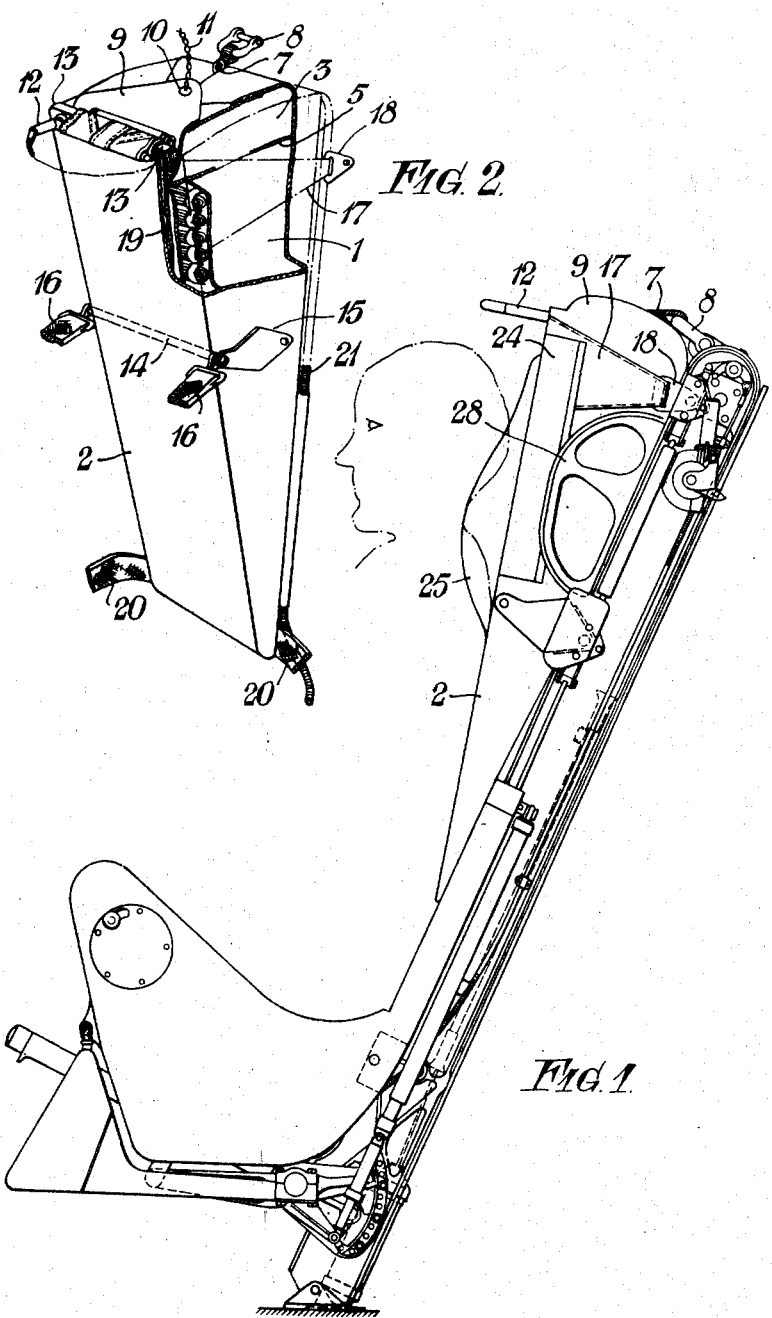
Inventor
JAMES MARTIN.
per Worth Wade
Attorney.

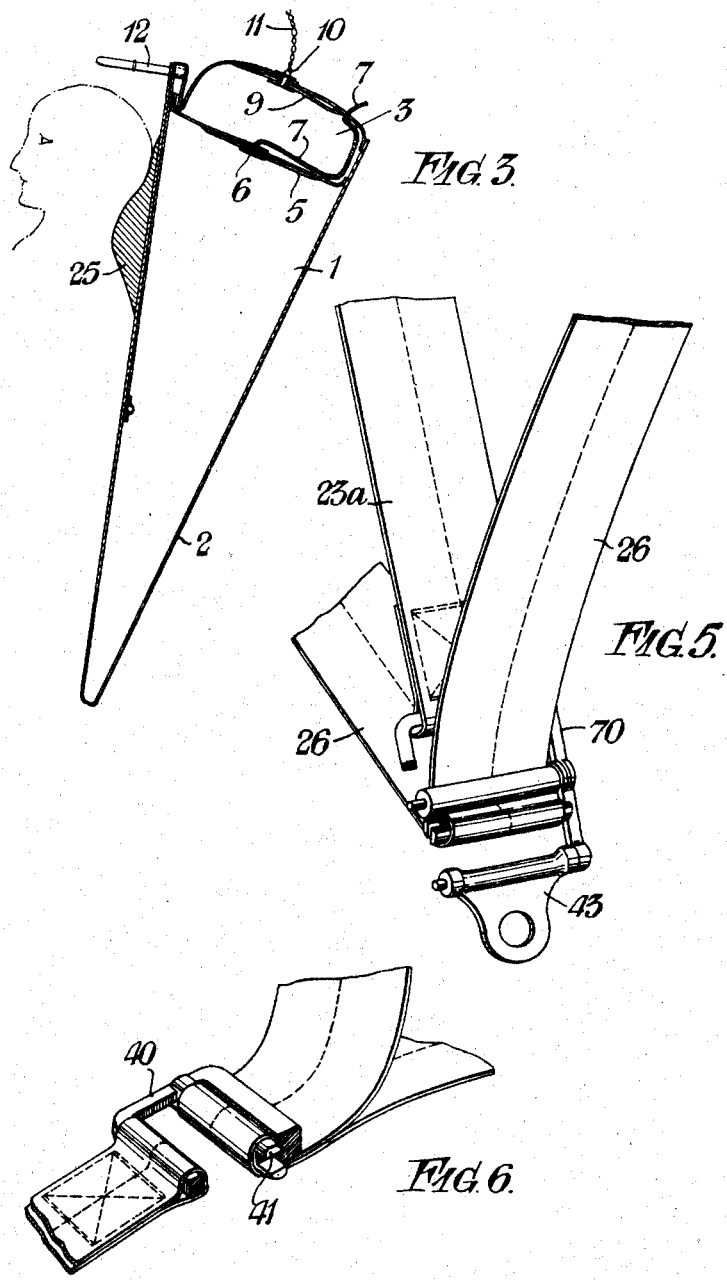

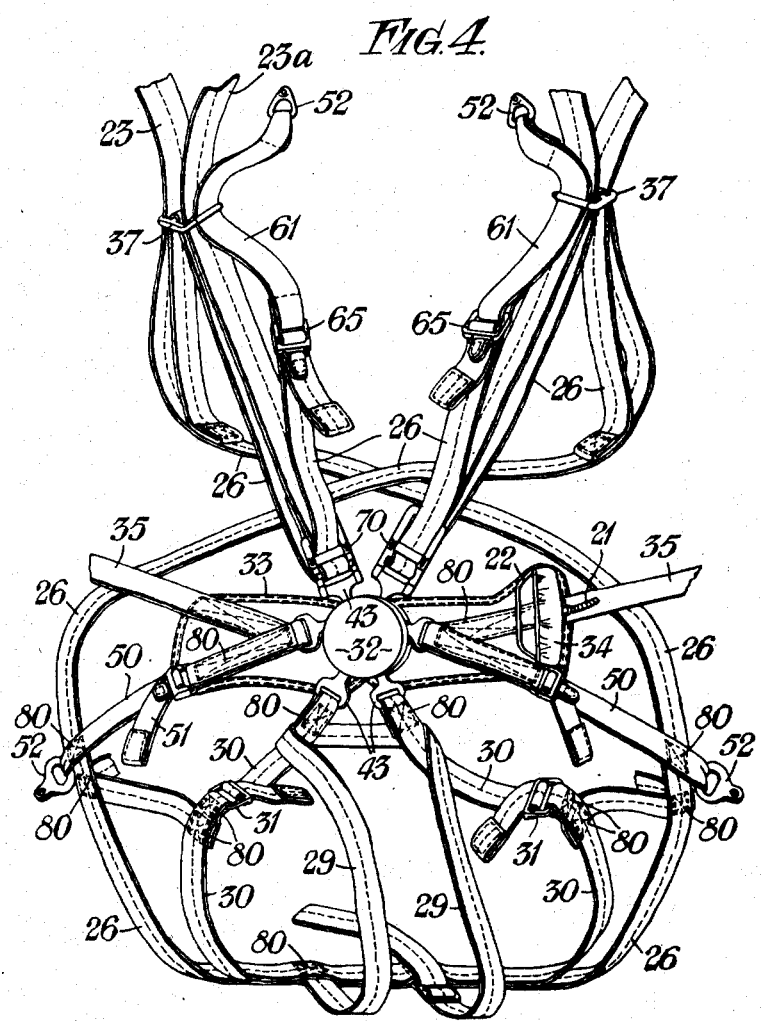

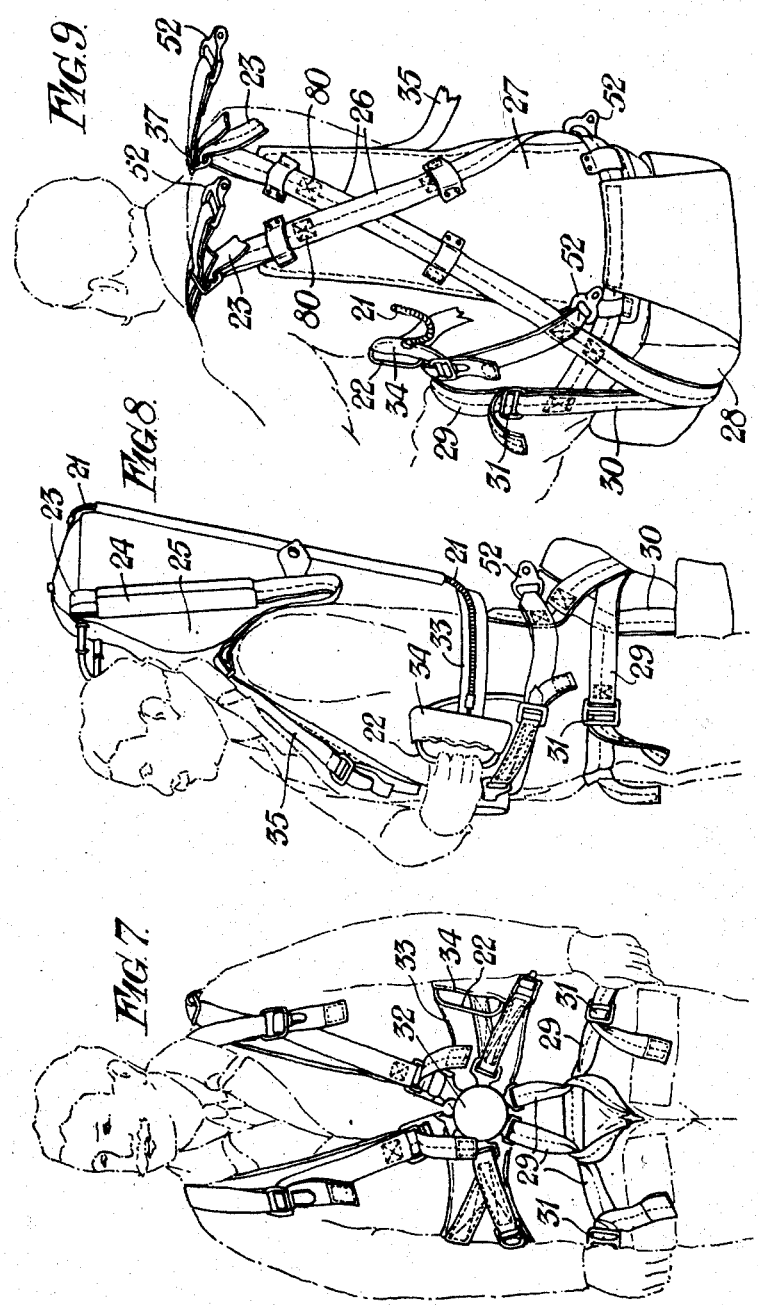

Patented Oct. 13, 1953

2,655,329

UNITED STATES PATENT OFFICE 2,655,329

PARACHUTE AND SEAT HARNESS

James Martin, Higher Denham, near Uxbridge, England

Application August 28, 1950, Serial No. 181,750
In Great Britain September 6, 1949

2 Claims. (Cl. 244—122)

This invention relates to arrangements of airman's harness.

With the conventional safety harness, i. e. lap strap type harness, the lap strap holds down the thighs but does not prevent the trunk from stretching as it does not get hold of the shoulders, so that the whole trunk is, in effect, an elastic medium which can and does extend or stretch appreciably when severe vertical acceleration is applied, for example when flying in bumpy weather at high speed. The usual shoulder straps do not serve to hold down the airman but only to hold him back in its seat, so that the airman is in danger of bumping his head on the cockpit or canopy which could have serious if not disastrous results if he was stunned.

An object of the present invention is to overcome this disadvantage by the provision of means whereby an airman is kept restrained in his seat, under the condition referred to above.

A further object of the invention is to provide a readily releasable harness and parachute pack arrangement suitable for use with control mechanism of an ejection seat for aircraft.

According to the present invention there is provided a one-piece harness serving both as a parachute harness and a safety or seat harness combined together as a single unit, the one-piece harness being so arranged and anchored to the seat to restrain the trunk of the airman against substantial extension or stretching when severe vertical acceleration is applied. Lateral and fore and aft as well as vertical restraint may be provided for with this combination harness.

With a one-piece harness according to the present invention the pilot is allowed greater freedom in flight whilst still being held down firmly in the seat.

Under another aspect of the invention the one-piece harness is associated with a parachute pack having upper and lower compartments respectively containing a drogue parachute and a main parachute.

The combined one-piece harness, that takes the place of the usual separate parachute harness and safety or seat harness, is provided with attachment plugs for plugging in the aircraft seat. Means are provided for adjusting the individual straps of the harness whilst the user is sitting in the aircraft seat and a single multipoint harness release box is provided for quickly releasing the user from the combination harness when required in place of the two normally used.

With the standard harness arrangement adjustment is a fairly long and involved process usually performed out of the aircraft. By the present invention correct adjustment is readily attained whilst sitting in the seat. Front adjustment is made possible.

The accompanying drawings illustrate a one-piece harness and also, one form of parachute pack with which the combined harness may be used.

In the drawings:

Fig. 1 is a side view of a wedge-shaped parachute pack combined with an ejection seat of the type which is adapted to be launched from an aircraft with the occupant seated therein.

Fig. 2 is a perspective view of the wedge-shaped parachute pack.

Fig. 3 is a sectional elevation of said wedge-shaped parachute pack.

Fig. 4 is a view showing the general lay-out of the combined harness.

Figs. 5 and 6 illustrate details thereof.

Figs. 7, 8 and 9 illustrate the combined harness as worn.

The one-piece harness comprises adjustable inner leg straps 29 and adjustable outer leg straps 30. Leg strap front adjustments are indicated at 31. As shown in Fig. 6 the adjustment device consists of an open frame 40 having a transverse member 41 loosely slidable thereon and around, which the free end of the strap passes. The transverse members have serrated or roughened faces to effect locking when the adjusting pull is relieved. Plugs 42 are provided for attachment to a six point harness release box 32. The harness release box 32 is located at the front and over a relatively wide waist strap 33. When the harness is used with the parachute pack according to Fig. 2, the waist strap has a pocket 34 with a rip cord handle 22 attached to a flexible release connection 21 to the parachute pack. There may be provided additional parachute pack attachment straps 35.

To hold the pilot back in his seat there are shoulder straps 61. These straps have plugs 52 which plug into locks on the seat beam, or in the case of an automatic ejection seat into a pair of locks of a system of locks on the seat frame. Also the straps may be attached to a cross tube 14 in the pack. Alternatively these plugs may be connected to a known harness release mechanism mounted on the parachute pack. The shoulder straps not only hold the pilot back in his seat, but provide fore and aft restraint. When a harness release mechanism is used this provides a means of releasing temporarily the shoulder straps and enables the pilot to lean forward as and when required. When the pilot resumes a normal posture the release mechanism in the box returns to normal position. The straps 61 are connected to top adjustment devices 65.

Back lift webs 23 and front lift webs 23a are provided. The front lift webs are attached to adjustment devices 70 (Fig. 5) and pass through lift web buckles 37 on the shoulders. The back lift webs also pass through the buckles 37.

There is a body harness strap 26 and two lap straps 50. Each lap strap is joined at one end to an intermediate part of the body harness strap 26, the lap straps and the body harness strap form in combination a combined strap having parts passing over the airman's shoulders and crossing diagonally over his back, the combined strap adjacent the connexions of the lap straps to the body harness strap having plugs 52 plugging into releasable locks on the seat pan at each corner thereof and close to the airman, and also being detachably secured by plugs 43 to a harness release box 32, the combined strap serving to hold the trunk of the airman against substantial stretching in a vertical direction when he is subjected to severe vertical acceleration.

Turning to the left hand side of Fig. 4 it will be seen that the path of the body harness strap 26, passes upwards from the plug 43 of the harness release box through the adjustment device 70, through the shoulder lift web buckle 37, over the shoulder and continues across the back of the pilot (see Fig. 9) down to the leg straps 29, 30, on the right hand side of Fig. 4. It then passes below a seat type dinghy pack across to the leg straps on the left hand side of Fig. 4 and takes an upward path but in a reverse direction across the back of the pilot (see Fig. 9) to the other shoulder lift web buckle and then down the front and through the other adjustment device 70 to the other plug 43.

Various components of the combined harness are stitched to one another at the parts indicated by 80.

It is also possible to fly with the shoulder harness slack thus giving the wearer greater freedom to look backwards without in any way impairing the efficiency of the harness for giving vertical restraint.

A single six point harness release box 32 is provided.

The seat type dinghy pack 28, Figure 9, is secured by the leg straps and a holder of flexible material may be provided for this pack.

As stated where required the various webs or straps are provided with means for adjusting them on the wearer and these means are provided in front so that the adjustment of each individual strap or web may be made rapidly by simply pulling on the end of the strap or web whilst the user is sitting in the seat in the aircraft.

The combination harness will now be described in connection with a parachute pack having upper and lower compartments containing respectively a drogue parachute and a main parachute. Such an arrangement is suitable for use with automatic control mechanism for use with an ejection seat or may be adapted for use with other types of seats having a releasable lock for securing the harness.

In the example of the invention illustrated embodying the combined one-piece harness and parachute pack a suitable main or personal parachute is packed in the lower compartment 1 of a wedge-shaped pack 2, as described in my U. S. Patent No. 2,569,638 of October 2, 1951. The small upper compartment 3 contains a drogue parachute for controlling the seat after ejection and for drawing the main parachute from its compartment. Dividing these compartments are four triangular flaps 5 secured by a detachable pin 6 or other suitable means. Attached to the pin 6 is a drogue cable 7 from a shackle 8 and thence through the flaps 5 to the top of the canopy of the main parachute (Fig. 3). Enclosing the upper or drogue compartment 3 and forming a top to the wedge-shaped pack are four similar flaps 9, similarly secured, the securing pin 10 in this case being connected to a drogue gun piston by a double length of nylon cord 11. A second pin securing the top flaps is connected to a manual rip cord 21 actuated by a rip cord handle 22 (Fig. 4). The withdrawal of either of these pins is sufficient to ensure the release of the drogue from its compartment in the pack. The drogue shackle projects through the top flaps to enable it to connect the sear of the firing mechanism of the ejection seat.

On the front face of the pack at the top is situated the firing control handle 12 the conical or other ends of which plug into conical bores or other suitable recesses, at the ends of a cross member 13 built into the pack. Spring loaded plungers lying axially in the bore of the cross member engage in grooves on the conical ends of the firing control handle serving to keep it in position rigidly whilst still permitting easy withdrawal of the handle.

The drogue gun and allied parts form no part of the present invention, but are described and illustrated in my pending application Serial No. 129,745 aforesaid now U. S. Patent No. 2,569,638 of October 2, 1951, and my Letters Patent No. 2,527,020.

Approximately half way down the front face of the pack a cross tube 14 may be built into the pack to which may be pivoted an attachment plate 15. The shoulder straps may be picked up at this point. The function of the cross tube is to prevent the pack being thrown forward if the aircraft should make a crash landing. Attachment plates on the harness straps and the pack are plugged into locks provided for them on the main frame of the ejection seat and they, together with the cross tube, form a cantilever structure which serves to support the pack vertically, i. e. the pack is prevented from sliding downwards when accelerated during ejection of the seat or sliding upwards due to negative "G" on the aircraft or in inverted flight.

A webbing strap 17 with attachment plates 18, which also plug into locks on the main frame of the seat, surrounds the top of the pack and prevents it bending forward above the cross tube in a crash landing or when the firing control handle is pulled.

A light gauge sheet metal plate 19 built into the pack prevents bulging and simplifies the attachment of the aforementioned cross members.

At the bottom or thin end of the wedge-shaped pack straps 20 are attached which engage in suitable buckles on the harness. This, together with the aforementioned shoulder straps picking up the cross tube 14, ensure that the pack is securely attached to the pilot.

The parachute lift webs 23 (Fig. 4) emerge from the top of the pack and are brought down the front or sides of the pack through snap fastened pockets 24, then turn upwards onto the shoulders of the pilot (Fig. 8). Sufficient slack is left to enable the pilot to lean forward in the seat after loosening his harness. This arrangement of the lift webs ensures that, when the parachute is withdrawn from the pack and the pilot is suspended from the lift webs, the pack is merely an empty shell still attached to the pilot's back.

Immediately below the firing control handle 12 on the forward face of the pack there may be provided a headrest 25 (Figs. 1 and 8). This is formed to fit into the nape of the neck where it gives maximum support and the greatest degree of comfort to the head.

A wedge form of pack is adopted because this gives the slenderest form of pack, provides a shape which fits snugly to the back of the pilot, and the resulting length provides maximum stability when used as a personal parachute. The narrow form of this pack also makes it possible to take the straps 26 (Fig. 9) straight back on either side of the pack down to a point on the main frame 27 of the seat rather lower than the pilot's shoulders. Another virtue of the narrow pack is that the rearward line of vision is unimpaired.

It will be apparent that the invention can be variously modified and changed within the scope of the appended claims.

I claim:

1. A combined harness for airman forming both a parachute harness and a seat harness permanently secured together as a unit construction and comprising a waist strap, a body harness strap, two lap straps, each lap strap being joined at one end to an intermediate part of the body harness strap, the lap straps and the body harness strap forming a combined strap having parts passing over the airman's shoulders and crossing diagonally over his back, plugs adjacent the connexions of the lap straps to the body harness strap plugging into releasable locks on a seat pan at each corner thereof and close to the airman, a six point harness release box on said waist strap, means on the ends of said body harness strap adjacent the release box for detachably securing said strap to said release box, means on the lap straps for detachably securing these to the release box, leg straps attached to the body harness strap, means at the ends of said leg straps for detachably securing these to the release box, back lift webs and front lift webs connected to said body harness strap, adjustment devices for said body harness strap and adjustment devices for said lap straps.

2. A combined harness as claimed in claim 1, having shoulder straps connected to the body harness strap.

JAMES MARTIN.

References Cited in the file of this patent

UNITED STATES PATENTS

| Number | Name | Date |
|---|---|---|
| 1,339,227 | Sebeto | May 4, 1920 |
| 1,898,090 | Lethern | Feb. 21, 1933 |
| 2,192,109 | Smith | Feb. 27, 1940 |
| 2,457,252 | Martin | Dec. 28, 1948 |
| 2,475,631 | Miller | July 12, 1949 |
| 2,495,381 | Moran | Jan. 24, 1950 |
| 2,516,004 | Kajdan | July 18, 1950 |
| 2,542,248 | Heffernan | Feb. 20, 1951 |

FOREIGN PATENTS

| Number | Country | Date |
|---|---|---|
| 589,945 | Great Britain | July 3, 1947 |